(12) United States Patent
Lachance

(10) Patent No.: US 7,789,400 B2
(45) Date of Patent: Sep. 7, 2010

(54) ANTI-ZIGZAG GUIDE RAIL WITH EXTENSION OF PROTECTION

(76) Inventor: Ghislain Lachance, 471, Rue des Cedres, St-Elzear De Beauce, QC (CA) G0S 2J0

( * ) Notice: Subject to any disclaimer, the term of this patent is extended or adjusted under 35 U.S.C. 154(b) by 193 days.

(21) Appl. No.: 12/150,644

(22) Filed: Apr. 29, 2008

(65) Prior Publication Data

US 2008/0203685 A1 Aug. 28, 2008

(30) Foreign Application Priority Data

Jun. 29, 2007 (CA) .................................. 2596445

(51) Int. Cl.
*B62B 17/02* (2006.01)
(52) U.S. Cl. ......................... 280/28; 280/609
(58) Field of Classification Search .................. 280/28, 280/11.18, 15, 21.1, 22, 22.1, 606, 608, 609
See application file for complete search history.

(56) References Cited

U.S. PATENT DOCUMENTS

| | | | | |
|---|---|---|---|---|
| 3,711,109 A | * | 1/1973 | Hofbauer | ..................... 280/28 |
| 3,857,578 A | * | 12/1974 | Alton | ........................... 280/28 |
| 4,869,336 A | * | 9/1989 | Nakasaki et al. | ............ 180/196 |
| 6,267,392 B1 | * | 7/2001 | Noble | .......................... 280/28 |
| 6,520,512 B1 | * | 2/2003 | Lachance | ..................... 280/28 |
| 6,626,444 B2 | * | 9/2003 | Noble | .......................... 280/28 |
| 6,974,139 B2 | * | 12/2005 | Lund | ........................... 280/28 |
| 7,017,695 B2 | * | 3/2006 | Meunier et al. | ............. 180/182 |
| 7,185,897 B2 | * | 3/2007 | Musselman | .................. 280/28 |
| 7,252,301 B2 | * | 8/2007 | Valikangas | .................. 280/609 |

* cited by examiner

*Primary Examiner*—Glenn Dayoan
*Assistant Examiner*—John D Walters

(57) ABSTRACT

The present invention relates to a prior application U.S. Ser. No. 11/705,116 <<ANTI-ZIGZAG GUIDE RAIL FOR SNOWMOBILE SKI>> wherein a flat rectangular extension (122) is added to protect from wear the skittle of a snowmobile ski when crossing rocky paths. The flat extension is used as floating link between the guide and the tail (131) of a wear runner laid out longitudinally of the ski. The guide (120) located at the front of the ski is always engaged, along with the self-sharpening runner, in ice, while the extension (122) keeps the back of the ski flat. The extension may be of a reversed U-shape comprising an extra web (135) and two extra cutting wings (136) protruding from the web (135) to a certain depth in direction of the ground and longitudinally of the extension, thus defining five cutting trails.

14 Claims, 2 Drawing Sheets

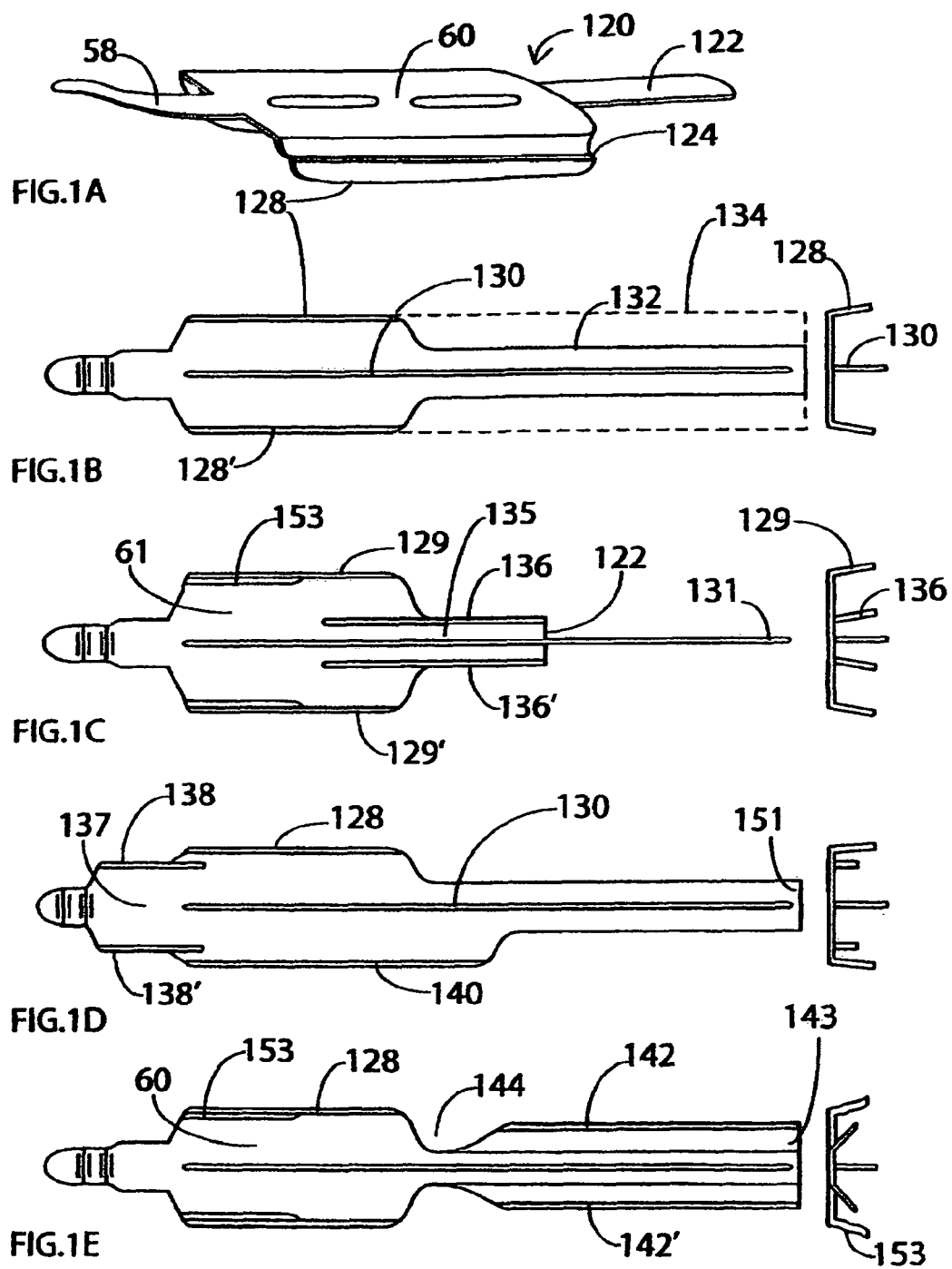

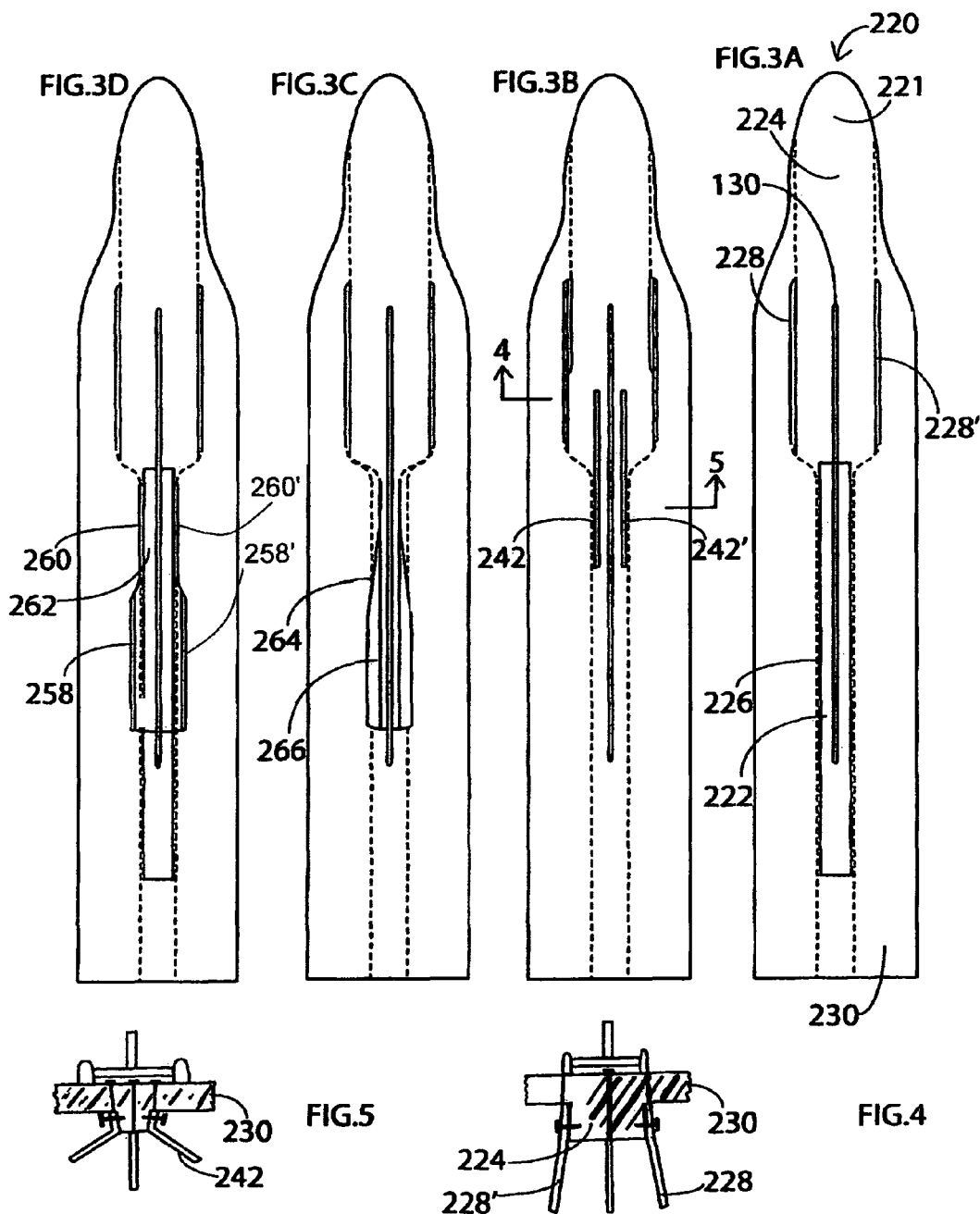

ANTI-ZIGZAG GUIDE RAIL WITH EXTENSION OF PROTECTION

BACKGROUND OF THE INVENTION

The present invention relates to the control of the skis of a snow vehicle, particularly to devices which control the traction of skis of a snow vehicle on soft ice.

PRIOR ART

The present invention refers to five preceding inventions of the same author: initially CA2300359 concerns a stabilizer in a reversed U-shape superimposed with an existing runner, the wings of the U being cutting while the web thereof is covered with a slipping product. CA2442304 concerns an aggressive product whose wings become aggressive repeatedly at the contact of several openings over its length; CA2388833 concerns a rectangular, thin runner which is laid out longitudinally and which is self-sharpening. CA2378638 concerns a reversed U-shape with a removable central runner. Finally U.S. Ser. No. 11/705,116 which includes two wings in a reversed U-shape whose web is tied to the lower face of a ski, combined with a particularly rectangular runner laid out on the side, in continuation and in line with the guide. Thus providing an adherence without floating on soft snow at the time of fast turns.

OBJECTIVES AND ADVANTAGES

A precise objective is to protect from wear the skittle of a snowmobile ski, by adding a rectangular flat extension to the runner, and to provide a better adherence of the guide especially in soft snow by adding cutting wings on the extension which when engaged on ice provide more stability to the snowmobile ski.

BRIEF DESCRIPTION OF THE DRAWINGS

FIG. 1A is a perspective of a guide alone with a tail
FIG. 1B are bottom and end views of the guide of FIG. 1A with a long tail
FIG. 1C are views of an enlarged guide with a short tail and five trails
FIG. 1D are views of the guide with a lengthened side and enlarged front
FIG. 1E are views of the guide with a neck and five trails
FIG. 2A are views of the guide with an enlarged tail
FIG. 2B are views of FIG. 1E but with oblique wings
FIG. 2C are views of the guide with a displaced side and rounded wings
FIG. 2D are views of the guide with central knives and seven trails
FIG. 2E are views showing a progressive tail and recessed wings
FIG. 3A is a view of a ski with guide and three trails
FIG. 3B is a view of a ski with guide and five trails
FIG. 3C is a view showing a progressive tail with guide
FIG. 3D is a view of a ski with guide and seven trails
FIG. 4 is a view according to section 4 of FIG. 3B
FIG. 5 is a view according to section 5 of FIG. 3B

DETAILED DESCRIPTION OF THE PREFERRED EMBODIMENTS

In the following description and in the accompanying drawings, the numeral numbers refer to identical parts in the various Figures.

FIG. 1A shows a guide 120 alone with a tie 58 which fits in a ski for attaching the guide thereto. A guide web 60 includes two cutting wings 128 disposed in direction of the ground and longitudinally of the ski. Those cutting wings are slightly open towards outside of the ski by a horizontal offset 124 of typically 1 mm. Knife wings 128 installed at the lower part of the wings render the wings cutting. One sees a short tail 122.

FIG. 1B shows the guide with a long tail 132, as long as a runner 130 and preferably exceeding it. The width of the long tail can be enlarged 134 as much as the spacing between the knife wings 128, 128'. The wings in the web of the guide are slightly open towards outside of the ski, the sharpness being encountered at the ends of the wings and digging two oblique trails on ice. An oblique angle for wings in the web guide is typically 10°.

FIG. 1C shows the guide with a short tail 122, shorter than the runner 130, in reversed U-shape comprising an extra web 135 and extra knives 136, 136' which continue under the guide. The web 61 of the guide is enlarged and spaced wings 129, 129' are slightly open towards outside of the ski by an offset wing 153. Moreover the FIG. 1C shows a runner 131 spread beyond the short tail 122. The runner 131 and the tail may be part of the web 61 or it may be in combination with a separate runner attached to a ski to which the web is mounted. Thereby defining five trails.

FIG. 1D shows a guide with a lengthened side 140 and with the front of the guide enlarged and in reversed U-shape combined with a web 137 and two front wings 138,138'. The tail ends 151 at the end of the runner.

FIG. 1E shows a guide in which a neck 144 connects the web 60 of the guide to the tail of the guide. Back knives 142,142' show 45° cutting wings spread until a tail end extension 143. The web 60 shows offset wings 153 which cover part of a knife wing 128. Wings 128,153,154 are slanted 0 to 45°.

FIG. 2A shows a guide with a longer neck 145 between the web of the guide and the tail, and an enlarged tail 147, larger than the web guide, with back spaced cutting wings 146. A runner 149, knife wings 128 and the spaced cutting wings 146 define five trails on the snow.

FIG. 2B shows the wings 148 on the tail more open towards outside by about 80°. It may be from 0 to 90°.

FIG. 2C shows the guide with a lengthened displaced side 154 and rounded wings 156 on the tail protruding in direction of the ground. One front wing 139 is in line with an end rounded wing 156 which result in a same trail with a total of five trails, not six, and particularly suited for a left hand or a right hand ski.

FIG. 2D shows the guide with a neck, between the web and the tail, in reversed U-shape comprising an intermediate web 162 and two intermediate cutting wings 160 which may be slanted 0 to 90°. Back rounded spaced wings 158 are showed. Thus defining seven trails.

FIG. 2E shows the guide with a progressive tail 164 and recessed wings 166 with an extension offset 170.

FIG. 3A shows a ski 220 comprising means acting like a guide including two parallel cutting wings 228, 228' laid out on the back of the ski and disposed in direction of the ground and longitudinally of the ski, a runner 130 between the cutters 228 and a rectangular extension 222 made in metal which is inserted in continuation of the cutters towards the back of the ski 220. A flat surface 224 in plastic is provided between the two cutting wings 228 and is prolonged until the front 221 of the ski 220. Those cutting wings are slightly open towards outside of the ski. A plastic surface 226 surrounds the extension 222. The runner 130 and the two cutters 228 define three trails on the snow.

FIG. 3B shows a ski with or without the extension 222 in front of which two parallel cutters 242, 242' are added longitudinally at its ends, thereby defining five trails on the snow.

FIG. 3C shows a ski with a progressive extension 264 and recessed wings 266 on it. An extension 222 is not shown and it may or may not be present.

FIG. 3D shows a ski with a rectangular neck 262 located between the front cutters and the back of the extension 222. The neck 262 comprises two parallel cutting wings 260, 260'. An enlarged rectangular section is added at the back of the extension and includes two parallel cutting wings 258, 258'. Thus defining seven trails on ice. The extension may or not be present.

FIG. 4 shows a plastic surface 230 between the two cutters 228, 228' which are fixed on it.

FIG. 5 shows the oblique cutters 242, 242' fixed on the plastic surface 230 and positioned on both sides of the metal extension 222.

SUMMARY OF THE INVENTION

A guide 120 to fix at the front of a ski of a snow vehicle defining a short section in reversed U-shape comprising a web 60 and two cutting wings 128 and provided with a rectangular extension at the back of the guide, on the tail 122 of the guide. The tail 122 can be as long as the wear runner 130 or shorter than the length of the wear runner. The tail can be flat or in reversed U-shape comprising an extra web 135 and two extra cutting wings 136 protruding from said web to a certain depth in direction of the ground and longitudinally of the extension. Those cutting wings protruding in direction of the ground can be slightly open towards outside or rounded, thereby defining five trails.

The web 60 of the guide 120 can be an enlarged web 61 for passing a sizeable quantity of snow between the five trails, and the front 137 of the guide can be defined with a pair of front cutters 138.

A wing offset 124 is defined for providing an enlarged channel for passing snow and rocks without obstruction. It may or not be present in any model.

An extension 143 is used to separate by a neck 144 the guide and the tail. The extension 143 can be enlarged in a tail 147 positioned externally to the cutting wings 128 of the web guide 60.

Front cutters 138 can be limited to one only on one side, a back part comprising two back cutters 156, one back cutter being aligned to one front cutter 138, the combination thereof encompassing five trails.

The neck 144 can be replaced either by a cutter section 162 with a pair of intermediate cutting wings 160 thereby causing a seven trail system, or by a progressive channel 164 and the extension 143 being enlarged to permit location of recessed wings 166 having an extension offset 170.

A snowmobile ski 220 used in combination with a runner 130 positioned longitudinally of the ski 220, the ski comprising in its front part 221 a pair of spaced front cutters 228, 228' for guiding snow on each side of the runner 130, the knives 228 being followed by an extension 222.

The ski combination comprises a front raised surface 224 adapted to retain the spaced front cutters 228. The extension 222 comprises a flat metal part adapted to slide over icy snowy surfaces. The extension 222 comprises a pair of obliquely disposed cutters 242 thereby defining five 5 trails.

The extension has a back raised surface width 226 equivalent to 55%+ or – 45% of the width of the front raised surface 224.

It is to be clearly understood that the instant description with reference to the annexed drawing is made in an indicative manner and that the preferred embodiments described herein are meant in no way to limit further embodiments realizable within the scope of the invention. The matter which is claimed as being inventive and new is limited only by the following claims.

| PARTS | |
|---|---|
| 58 | Tie |
| 60 | Guide web |
| 61 | Enlarged web |
| 120 | Guide |
| 122 | Short tail |
| 124 | Horizontal offset |
| 128, 128' | Cutting wings |
| 129, 129' | Spaced wings |
| 130 | Wear runner |
| 131 | Runner spread beyond the tail 122 |
| 132 | Long tail |
| 134 | Enlarged tail |
| 135 | Extra web |
| 136, 136' | Extra wings on short tail |
| 138 | Frint spaced wings |
| 139 | A single front wing |
| 140 | Lengthened side |
| 142, 142' | Back knives |
| 144 | Neck |
| 143 | Tail end extension |
| 145 | Longer neck |
| 146 | Back spaced cutting wings |
| 147 | Tail larger than the web guide |
| 148 | 50° opened cutting wings |
| 149 | Runner for a longer neck guide |
| 151 | Tail end |
| 153 | Offset wing |
| 154 | Lengthened displaced side on a guide |
| 156 | Rounded wing |
| 158 | Back rounded cutting wings |
| 160 | Intermediate cutting wings |
| 162 | Intermediate cutter section |
| 164 | Progressive tail |
| 166 | Recessed wings |
| 170 | Extension offset |
| 220 | Ski |
| 221 | Front of the ski |
| 222 | Extension |
| 224 | Raised surface |
| 226 | Plastic surface around the tail |
| 228, 228' | Front cutters in a ski |
| 230 | Plastic surface |
| 242, 242' | Oblique cutters |
| 258, 258' | Back wings in a ski |
| 260, 260' | Intermediate wings in a ski |
| 262 | Neck in a ski |

I claim:

1. A guide (120) to fix at the front of a ski of a snow vehicle, said guide defining a section in reversed U-shape comprising a web (60) and two cutting wings (128) protruding from said web to a certain depth in direction of the ground and longitudinally of said ski, said web comprising means for fixing to a lower face of said ski, said guide having a tail (122) wherein said tail (122) defines a section in reversed U-shape comprising an extra web (135) and two extra cutting wings (136) protruding from said extra web to a certain depth in direction of the ground and longitudinally of said ski, when used in combination with a central wear runner (130) thereby defining five trails.

2. The guide of claim 1 comprising a front part (137) provided with a pair of front cutters (138) aligned between and parallel to said cutting wings (128) and defining thereby five trails.

3. The guide of claim 2 wherein said front cutters (138) are limited to one (139) only on one side, a back part comprising two back cutters (156), one back cutter being aligned to said one front cutter (139), the combination thereof encompassing five trails.

4. The guide of claim 3 wherein said back cutters (156) are rounded.

5. The guide of claim 1 wherein said cutting wings comprise an offset wing (153) for providing a channel for passing snow and rocks without obstruction.

6. The guide of claim 1 wherein said web (60) is an enlarged web (61) comprising a pair of extra wings (136) capable of passing a quantity of snow between said five trails (129, 129', 131,136,136').

7. The guide of claim 1 comprising an extension (143) separated by a neck (144) from said guide web, said extension comprising a pair of cutting wings (142) disposed at a slant about said tail, said slant being greater than 0° and smaller than 90°.

8. The guide of claim 7 wherein said extension (143) is an enlarged tail (147) of width greater than that of said cutting wings (128) and positioned externally to said cutting wings (128) of said web guide (60).

9. The guide of claim 7 wherein said neck (144) is replaced by an intermediate cutter section (162) with a pair of intermediate cutting wings (160) thereby defining a seven trail system.

10. The guide of claim 7 wherein said neck (144) is replaced by a progressive channel (164) and said extension (143) is greater in width than said channel (164) to permit location of recessed wings (166) having an extension offset (170).

11. A snowmobile ski (220) used in combination with a runner (130) positioned longitudinally of said ski (220), said ski comprising in its front part (221) a pair of spaced front cutters (228,228') for guiding snow on each side of said runner (130), said knives (228) being followed by an extension (222), said ski comprising a front raised surface (224) adapted to retain said spaced front cutters (228), said extension (222) comprising a flat metal part adapted to slide over icy snowy surfaces, said extension (222) comprising a pair of obliquely disposed cutters (242), when used in combination with said runner (130) thereby defining five trails.

12. The ski of claim 11 wherein said extension has a back raised surface width (226) equivalent to 55%+ or −45% of the width of said front raised surface (224).

13. The ski of claim 11 wherein said extension comprises a progressive channel (264) and said extension is greater in width than said channel to permit location of recessed wings (266).

14. The ski of claim 11 wherein said extension comprises an intermediate cutter section (262) with a pair of intermediate cutting wings (260) thereby defining a seven trail system.

* * * * *